3,472,593
OPTICAL METHOD AND APPARATUS FOR MEASURING THE VELOCITY OF A FLUID RELATIVE TO AND IN A DIRECTION PARALLEL TO THE HULL OF A SHIP

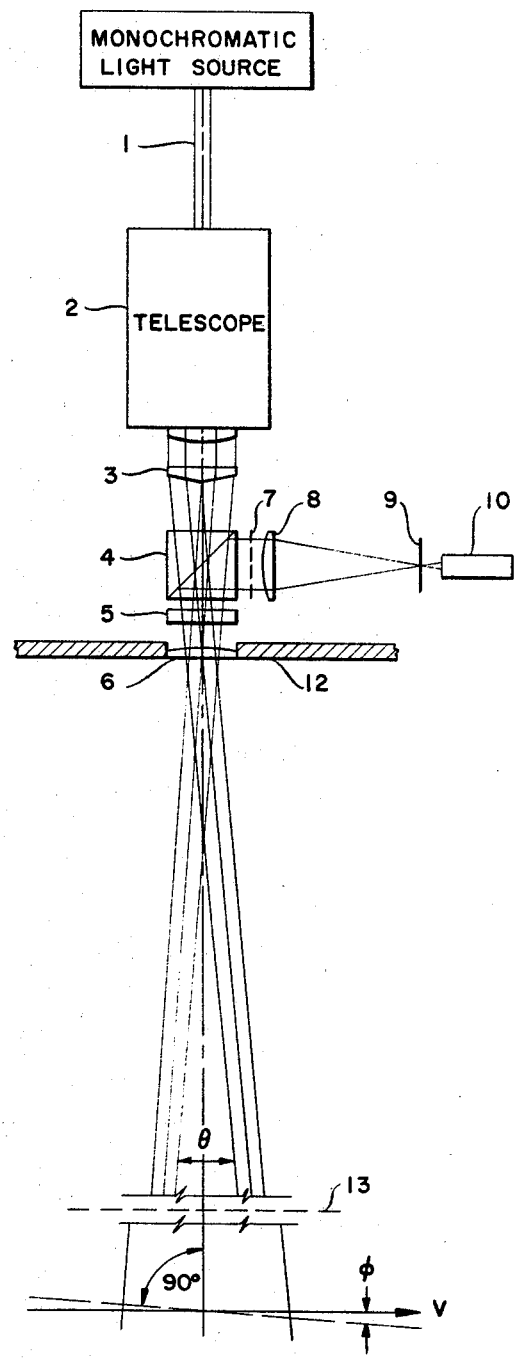

John W. Drinkwater, Chester, England, assignor to Shell Oil Company, New York, N.Y., a corporation of Delaware
Filed Nov. 29, 1967, Ser. No. 686,610
Claims priority, application Great Britain, Nov. 30, 1966, 53,562/66
Int. Cl. G01p 3/36
U.S. Cl. 356—28        5 Claims

ABSTRACT OF THE DISCLOSURE

A laser beam is passed through an interferometer and focused through a window in the hull of a ship at two points in the water. Light back-scattered by the water is brought together and produces interference fringes that move with a velocity proportional to the speed of the water passing the hull. The velocity of the fringe movement is detected with a photodetector.

Background of the invention

The present invention relates to an apparatus for measuring the speed of fluids and is particularly concerned with a ship's log.

The performance of every ship deteriorates with time because the hull roughens and accumulates marine growth. Consequently the engine power needed to maintain service speed increases, and there comes a time when it becomes economical to dry-dock the ship and clean and paint the hull.

This time i.e., the economical period between dockings, can only be determined by measuring the performance of the ship. This entails measuring the speed of the ship through the water with a high degree of accuracy. (An error of ±¼% would be tolerable.)

At present this can be done by measured mile trials in which the speed of the ship is measured with respect to land and corrected for tide. Because these trials involve taking the ship out of service and steaming the ship to a place where there is a measured mile, they are very inconvenient and expensive.

It is the aim of the present invention to provide an apparatus which can be used to give an accurate measurement of a ship's speed while the ship is in normal operation. The apparatus is not primarily a navigational instrument but serves to assess the performance of the ship from time to time so as to indicate when the ship should be dry-docked for overhaul.

Summary of the invention

According to the present invention an apparatus for measuring the speed of a fluid moving relative to and in a direction parallel to a rigid boundary comprises a laser light source the uniphase wavefront from which is divided by a division of wavefront interferometer and brought to two foci in the body of the fluid whereby light back-scattered by the fluid re-enters the apparatus, the two collimated beams producing interference fringes which move at a frequency proportional to the speed of the fluid relative to the boundary in a direction of a line joining the two foci, and means for measuring said frequency.

Preferably the apparatus is utilized as a ship's log. The laser source, interferometer and measuring means are housed in the hull of the ship and arranged so as to project light downwards through a window in the bottom of the ship to two foci just outside the boundary layer of water adjacent the ship's hull. Light is scattered back from these foci to retraverse the interferometer and produce the interference fringes. The boundary layer is that layer of water adjacent the hull which is to some extent entrained by the movement of the ship through the water. It is therefore necessary to scatter light from water beyond the boundary layer in order to obtain a true measurement.

Preferably a telescope is incorporated in the apparatus between the laser source and the interferometer.

Though primarily designed as a ship's log it is envisaged that the apparatus of the invention could equally be used for the measurement of fluid flow in pipes.

Brief description of the drawings

The invention will be described further, by way of example, with reference to the accompanying diagrammatic drawing of a ship's log.

A log comprises a monochromatic or laser light source 1, an interferometer and a photo-detector 10. A telescope 2 for expanding the narrow beam emitted by the laser source is arranged between the source and the interferometer. As an example, the interferometer comprises a Fresnel bi-prism 3, that is a bi-prism of very obtuse angle, a Brewster prism 4, a quarter wave plate 5 and an objective lens 6 located beyond the quarter wave plate 5. The function of this lens is to focus the two inclined collimated light beams produced by the bi-prism at points remote from the apparatus. A spatial filter 7, a condenser lens 8 and a stop 9 are arranged between the Brewster prism and the photo-detector.

In use, the log is mounted within the hull 12 of a ship directly above a window inserted in the bottom of the hull. The window can be objective lens 6, which can be recessed slightly into the hull in order to protect it.

The continuously operating laser source 1 produces a coherent, intense, monochromatic, collimated, plane polarised beam of light having a single uniphase wave front and this beam is expanded by the telescope before it enters the bi-prism 3. The bi-prism splits the single beam into two separate collimated beams of light inclined at a small angle θ. These two beams pass through the Brewster prism 4, the quarter wave plate 5 and the objective lens 6 into the sea and are brought to two foci by the objective lens at two points in the seal lying just outside the boundary layer. The limit of the boundary layer is indicated by reference numeral 13 in the drawing.

In the drawing assume that the ship is moving from right to left, in other words the sea water will be moving in the opposite direction relative to the ship as shown by the arrow. The water passing through one of the foci has a component of velocity along the direction of the beam and this component is directed towards the objective lens 6. The water passing through the other of the foci has a component of velocity along the beam which is directed away from the objective lens. If the velocity of the water relative to the ship is V and is direction is normal to the axis of the laser, the difference between these two components of velocity will be $$2V \sin \frac{\theta}{2}$$

Scattered light from both foci will be collected and collimated by the objective lens 6. The light then retraverses the quarter wave plate 5. The two traverses of this plate rotate the plane of polarization of the light through 90°. Consequently the Brewster prism reflects the scattered light, whereas it transmits the original incident light.

The two collimated, but inclined, sets of wave fronts, one from each focus, interfere to produce bands or fringes of light separated by a distance λ/θ where λ is the wave length of the laser light. When the $V=0$ the interference fringes are at rest.

However when $V \neq 0$ the interference fringes move parallel to the exit face of the Brewster prism, passing across at a characteristic frequency (the Doppler frequency) given by $$f = \frac{4nV}{\lambda} \sin \frac{\theta}{2}$$

where $n$ is the refractive index of the sea water. This frequency can be detected by means of the spatial filter 7 which is in the form of a grating, the pitch of the rulings of which is equal to the distance between adjacent fringes. The light passing the grating is focussed onto the stop 9 by the lens 8. The stop 9 is conjugate to the two foci and prevents light scattered from points remote from the foci from reaching the photo-detector.

One advantage of the log as described above is that it is insensitive to the trim of the ship. Should the water be moving at an angle $\phi$ to the normal to the laser axis then the difference in velocity of the components will be $$2V \sin \frac{\theta}{2} \cos \phi$$

Another advantage is that the log is insensitive to turbulence in the sea because the incident and scattered light follow identical paths. The interference fringes will respond only to optical differences in the water which occur in the time between the emission of the incident light and the return of the scattered light. This time interval is so short, of the order of 10 ns., that turbulence can be ignored.

Further advantages result if the principal rays of the two beams intersect at the front surface of the objective lens. As a result the apparatus will tolerate changes in the optical characteristics of the lens surface and it will be least sensitive to turbulence. The first advantage follows because the two beams pass into the sea water through the same part of the lens, the second one because the two beams overlap in the region of maximum turbulence immediately adjacent the hull.

Yet a further advantage lies in the fact that the inclination of the two beams may be made small, thus reducing the Doppler frequency and permitting the use of a detector of modest bandwidth and therefore low noise level.

Still further advantages reside in the features that the two beams will have equal intensities, and equal optical path lengths.

Although the apparatus has been described with reference to a ship's log it will also be capable of measuring the speed of fluids generally. As hitherto mentioned the apparatus can be used for determining the rate of flow of fluids in pipes. In such a case the apparatus will be set up outside the pipe with the axis of the laser beam normal to the axis of the pipe. The light will be passed through a window in the pipe and focused at two separate points within the fluid flowing in the pipe. As in the case of the ship's log, light scattered back from these two points will produce interference fringes, the Doppler frequency of which will be directly proportional to the rate of fluid flow in the pipe.

I claim as my invention:
1. In a method of detecting the velocity of water moving past a ship's hull wherein a transparent window is located below the water level, the steps of
   generating a beam of monochromatic light;
   splitting said beam of monochromatic light into two beams;
   directing said two beams into the water moving past said ship such that part of the monochromatic light from each of the said two beams is reflected to some remote point; and
   detecting the frequency of a variation of the intensity of light at said remote point due to the Doppler effect.

2. An apparatus for accurately measuring the relative velocity of water moving past a ship's hull wherein there is a transparent window below the waterline, comprising:
   a source of monochromatic light, positioned inside said ship, said source adapted to supply a beam of continuous monochromatic light;
   a photodetector;
   a spatial filter, positioned in front of said photodetector; and
   an interferometer adapted to accept said monochromatic light from said monochromatic light source, focus said light in said water such that a portion thereof is reflected onto said spatial filter.

3. The apparatus of claim 2 wherein said interferometer includes
   a bi-prism optically communicating with said monochromatic light source;
   a Brewster prism optically communicating with said bi-prism and said spatial filter;
   a quarter wave plate optically communicating with said Brewster prism; and
   an objective lens optically communicating with said quarter wave plate and adapted to focus light in said water.

4. The apparatus of claim 3, wherein a wave broadening means is optically positioned between said monochromatic light source and said bi-prism.

5. The apparatus of claim 4 wherein a
   a condenser lens is optically positioned between said spatial filter and said photodetector.

References Cited
UNITED STATES PATENTS

| | | | |
|---|---|---|---|
| 3,073,168 | 1/1963 | Adams et al. | 356—106 X |
| 3,199,400 | 8/1965 | Zabinski | 356—106 X |
| 3,373,441 | 3/1968 | Zadig | 343—8 X |
| 3,409,369 | 11/1968 | Bickel | 356—28 |
| 3,417,251 | 12/1968 | Leonard et al. | 250—218 |

WALTER STOLWEIN, Primary Examiner

U.S. Cl. X.R.

73—194; 250—218